United States Patent [19]
Engel et al.

[11] Patent Number: 5,666,468
[45] Date of Patent: Sep. 9, 1997

[54] NEURAL NETWORK BINARY CODE RECOGNIZER

[75] Inventors: Stephen J. Engel, East Northport, N.Y.; Clark Jeffries, Clemson, S.C.

[73] Assignee: Grumman Corporation, Los Angeles, Calif.

[21] Appl. No.: 348,564

[22] Filed: Dec. 2, 1994

[51] Int. Cl.$^6$ .................................................. G06F 15/18
[52] U.S. Cl. .............................. 395/24; 395/25; 395/27
[58] Field of Search .............................. 395/24, 27, 25

[56] References Cited

U.S. PATENT DOCUMENTS

| | | | |
|---|---|---|---|
| 4,660,166 | 4/1987 | Hopfield | 395/24 |
| 4,807,168 | 2/1989 | Moopenn et al. | 395/24 |
| 5,023,833 | 6/1991 | Baum et al. | 395/24 |
| 5,216,750 | 6/1993 | Smith | 395/24 |
| 5,274,743 | 12/1993 | Imondi et al. | 395/23 |
| 5,440,670 | 8/1995 | Frazier | 395/23 |

OTHER PUBLICATIONS

Jeffries, C. et al., "High Order Neural Network Models for Error Correcting Code", Conference Proceedings of the Society of Photooptical Instrumentation Engineers, Orlando, Fla., Mar. 1990.

Carlson, R. et al., "Efficient Recognition with High Order Neural Networks", Conference Proceedings of the Society of Photooptical Instrumentation Engineers–1469, Orlando, Fla., Apr. 1991.

Jeffries, C., "Code Recognition with Neural Network Dynamical Systems", Society for Industrial and Applied Mathematics, vol. 32, No. 4, pp. 636–651 Dec. 1990.

Jeffries et al., "Dense memory with High Order Neural Networks", Proceeding of the Twenty–first Southeastern Symposium on System Theory IEEE 1989.

Primary Examiner—George B. Davis
Attorney, Agent, or Firm—Terry J. Anderson; Karl J. Hoch, Jr.

[57] ABSTRACT

A neural network binary code recognizer for decoding n-bit binary code words. This apparatus includes inputs for inputting n signals into the recognizer, each of the n signals representing a bit value of an n-bit binary code word, which may or may not be corrupted. The apparatus also includes n amplifiers, each having an input for receiving a respective input signal. The amplifiers condition the respective input signals to generate respective output signals at one or more bit values of one or more corresponding predetermined valid n-bit binary code words. The apparatus further includes a device for approximating an image product for each of the one or more predetermined valid n-bit binary code words, each approximated image product comprising the product of an output signal from each amplifier in accordance with a respective predetermined valid n-bit binary coded word. Each approximated image product is fed back to an input of each amplifier in accordance with a bit value of one or more predetermined valid n-bit binary code words to enable an output signal of a respective amplifier to dynamically approach each bit value of the input n-bit binary code word.

18 Claims, 4 Drawing Sheets

NNBCR PROGRAMMED FOR VALID CODES 1,0 AND 0,1

FIG. 1
(PRIOR ART)

FIG. 2: NNBCR PROGRAMMED FOR VALID CODES 1,0 AND 0,1

FIG. 3 Gain function $g(X_i)$

FIG. 4 Example trajectory

NEURAL NETWORK BINARY CODE RECOGNIZER

BACKGROUND OF THE INVENTION

1. Field of the Invention

The present invention relates generally to an apparatus that provides error correction for encoded digital communications. More particularly, the invention is an analog device employing the architecture of a high order neural network model that operates in continuous space as a dynamical system for reliably achieving error correction of conventionally encoded digital communications with significantly lower error rates.

2. Description of the Prior Art

The use of error-correcting codes for the reliable transmission of digital information is commonplace in most communication systems. One conventional way to achieve an error-correction capability is to add certain number of extra bits to the actual information bits in a way that maximizes the Hamming distance between the code words. The resulting minimum Hamming distance "d" of such a (binary) block code, which is the minimum number of bits in which all pairs of words differ, is a key property of the code. Specifically, a code is capable of correcting up to "t" errors in any received word if $d \geq 2t+1$. For example, in a Hamming (7,4) code, the number of information bits is 4 and the number of transmitted bits is 7. The extra transmitted bits allow the separation between the $2^4$ possible meaningful data so that if some of the bits are corrupted, the result will not be too far away from the original to be found. In the Hamming (7,4) code, the minimum distance between meaningful data is 3 so that all pairs of transmitted codes differ by at least three bits. If one bit is corrupted during transmission, it is still easy to recover the original by finding the closest match (nearest Euclidean or Hamming neighbor) in a table of valid codes.

Another popular error correction code is the Hadamard nonlinear code where the distance between the codes is larger and thus has a greater corruption resistance.

Presently, to achieve decoding and possible error-correction of these types of codes, a "hard-decision" type decoding technique utilizing conventional, linear algebraic decoding algorithms may be employed. This technique requires a thresholding of the incoming noisy, analog signal in order to obtain binary values of the incoming signal. Specifically, the thresholding technique requires that each of the bits in the received string of "n" bits be rounded to a 1 or 0, before any decoding algorithm is used. In the process of rounding, some potentially useful information about the original string is lost.

A "soft-decision" type decoding technique operates with the incoming signal directly and results in improved error-correction capability.

Other types of coding techniques, such as convolutional codes, which are based on a different principle than block codes, can be combined with decoding techniques that allow soft-decision decoding. However, those techniques involve increased computational complexity that is prohibitive for certain applications.

As discussed in the article entitled "Code Recognition with Neural Network Dynamical Systems" by C. Jeffries, Society for Industrial and Applied Mathematics Review, Volume 32, No. 4, December 1990, a class of dynamical systems called neural networks can serve as a fully analog computer to simulate some aspect of cognition. More specifically, one type of mathematical neural network model is an n-dimensional difference equation or differential equation dynamical system that accounts for the dynamics of n neurons. Each neuron is mathematically a state $x_i$ (a real number) with an associated output $g_i = g_i(x_i)$, typically a ramp or sigmoidal gain function $g_i(x_i)$. The time rate of change of $x_i$ is determined by a system function dependent on $x_i$ itself and the outputs of $g_i(x_i)$. Thus, the purpose of the model is to exhibit dynamics analogous to image recognition, learning, limb control, or some other function of a central nervous system.

In the context of code recognition and error correction of data, a neural network can be used to simulate memory retrieval. As discussed in the C. Jeffries article, the time evolution of a trajectory of such a system is mathematical "recognition", meaning convergence to one of several "attractors" referred to as mathematical memories. The attractors are prespecified constant trajectories or limit cycles and mathematical recognition amounts to regarding an input binomial n-string with component values ranging from ±1 as an initial state of a trajectory, and observing the subsequent convergence of that trajectory to one of the memories. A model with such dynamics is said to have "content-addressable memory" because partial or imperfect knowledge of a memory leads to complete retrieval of the memory through system dynamics. Thus, the principle of operation of content-addressable memories is pattern completion or pattern correction, that is, the retrieval of a stored pattern that best fits an input pattern which is distorted or contains incomplete information. This is equivalent to decoding error-correcting binary codes if the code words are memories stored in the neural network and the inputs to the network are the analog estimates of data transmitted over a noisy channel. After presentation of this analog vector representing an initial value, the neural network as a dynamical system should then ideally converge to the closest attractor and produce the stored code word at its output, thus, performing soft-decision decoding.

For a successful application of a neural network to perform as a content-addressable memory, the neural network has to be capable of storing arbitrary words, and it has to be guaranteed that the stored words represent the only stable attractors of the memory. The limited success in using neural networks for this application can be attributed to the limitations of current models, which do not allow the storage of arbitrary words, have a limited memory capacity, and cannot guarantee that the stored patterns constitute the only attractors of the dynamical system.

Other disadvantages include the large number of electronic devices that must be included in order to provide error correction of larger encoded data words and the difficulty in implementing such a neural network in a monolithic chip.

SUMMARY OF THE INVENTION

It is an object of the instant invention to provide a neural network binary code recognizer that implements a high order neural network memory model for providing error correction of encoded digital communications.

It is another object of the instant invention to provide a neural network binary code recognizer that implements a high order neural network memory model utilizing constant attractors that can store using n neurons any arbitrary number M, $1 \leq M \leq 2^n$, of any binomial n-strings as constant attractor memories.

It is yet another object of the instant invention to include a minimum operator means in a neural network binary code recognizer that reduces the amount of processing circuitry and further accelerates the binary code recognition process.

It is yet a further object of the present invention to provide a neural network binary code recognizer that provides soft-decision decoding with any block code.

It is still a further object of the present invention to provide a neural network binary code recognizer that implements a dynamic system that is guaranteed to converge to stable attractors or indicate that a decision cannot be made when given arbitrary analog values as initial input.

It is still another object of the present invention to provide a neural network binary code recognizer that can error-correct noisy binary code arriving in non-binary form without first rounding signal digits to zero or 1 (in x-space, for e.g.) and, without implementing conventional serial decoding algorithms.

It is yet still another object of the present invention to provide a neural network binary code recognizer that implements a high order neural network memory model that can achieve one to three orders of magnitude fewer errors compared to conventional serial decoders which first round signals to binary values.

These and other objects of the invention are achieved with a neural network binary code recognizer for decoding corrupted n-bit digital code words. Specifically, the binary code recognizer comprises a means for inputting n analog signals into said recognizer, each of the n analog signals representing a bit value of a n-bit digital code word. The recognizer also includes n amplifier means each for storing a respective bit of one or more predetermined valid n-bit binary coded words, each said amplifier means having one or more inputs for receiving a respective said analog signal, and, one or more outputs, each said n amplifier means generating an output signal at said one or more outputs. A means for generating an image product for each of said one or more predetermined valid n-bit binary code words is also provided, each image product comprising the product of one of said one or more output signals for each said n amplifier means in accordance with a stored bit value of each respective amplifier means. Additionally, a feedback means is provided for connecting each said generated image products with one of said one or more inputs of each said amplifier means in accordance with said stored bit value of each respective amplifier means to enable each output signal of each respective amplifier means to dynamically approach its respective stored bit value to form said predetermined valid n-bit binary code word.

DETAILED DESCRIPTION OF THE INVENTION

The neural network binary code recognizer is an analog device that implements a high-order neural network memory model. It is essentially an analog computer in the form of an n-dimensional dynamical system operating in continuous space with solutions of a problem represented as prespecified constant attractor trajectories (stable equilibria). The mathematical theory of the memory model is given in the C. Jeffries article, mentioned above.

Specifically, each neuron is governed by the differential equation (1) in which it is possible to store any combination of the $2^n$ possible memories, even all $2^n$:

$$\frac{dx_i}{dt} = -x_i + \sum_{l=1}^{M} (2\,ml_i - 1)Il \quad (1)$$

where, $$Il = \prod_{j=1}^{n} \{ml_j\, g_j(X_j) + (1 - ml_j)(1 - g_j(X_j))\} \quad (2)$$

and, $$g(X_j) = \phi \text{ if } X_j \leq -e \quad (3)(a)$$
$$1 \text{ if } X_j \geq e,$$
$$\frac{X_j}{2e} + \frac{1}{2} \text{ if } -e < X_j < e$$

Figure 3:
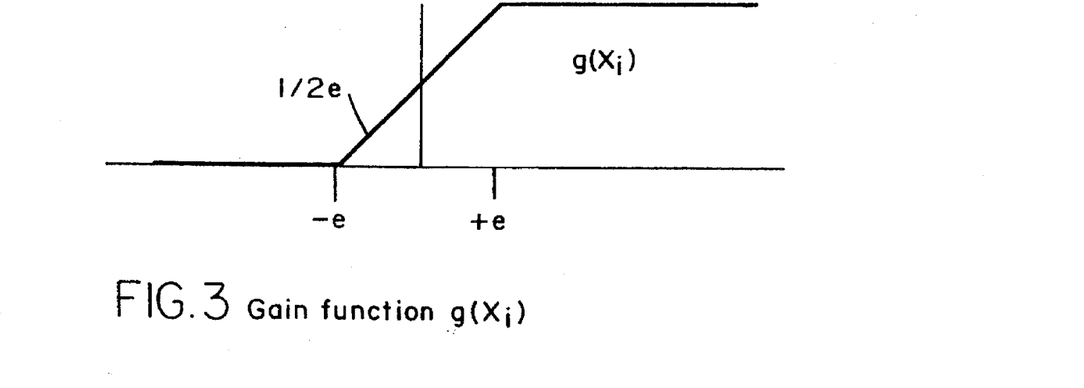
FIG. 3 illustrates the gain function for each neuron (amplifier), $g(x_i)$, in the transition region bounded by $-e$, $+e$.

As mentioned above, $x_j$ is the internal state of the neuron and $g(x_j)$ is the activation function (neuron output). The slope of the gain function at 0 is denoted $(2e)^{31\ 1}$ and is the gain of the amplifier as illustrated in FIG. 3. The activation function $g(X_j)$ may also be a sigmoidal input/output relation having a relation similar to that obtained by equation (3) (b).

$$g(X_j) = \frac{1}{2}\left[1 + \tanh\left(\frac{X_j}{2e}\right)\right] \quad (3)(b)$$

The $ml_j$, where $l=1, \ldots, M$ and $j=1, \ldots, n$ are of values $ml_j=1$ or 0, and constitute the M valid codes or stored memories (each of n bits). In mathematical terms, ml is stored as a constant trajectory $x_j$ for equation (1) above if $g_j(x_j)=ml_j$ for $j=1,2,\ldots,n$. Neural networks used in content addressable memory or pattern recognition have only constant trajectories corresponding to memories as attractors. The transition zone, $T_e$, is that portion of state space in which at least one amplifier is in transition (some $g_i$ is between 0 and 1) as shown in FIG. 3 and explained in further detail below. Thus, each I is turned on (=1) in exactly one orthant and turned off (=0) in all others.

The high-order neural network memory model is characterized as using in its system function sums of products of neuron outputs called the image products Il. There is an image product for each of the M valid code words. For example, if n=4 and ml=(0,1,0,1), then $Il=(1-g_1)g_2(1-g_3)g_4$ as defined by equation 2.

It takes n neurons to construct the system. Each of the n neurons is initialized with the $n^{th}$ bit in the received string and then they evolve with time to a stable state that corresponds to the nearest ml.

Figure 1:
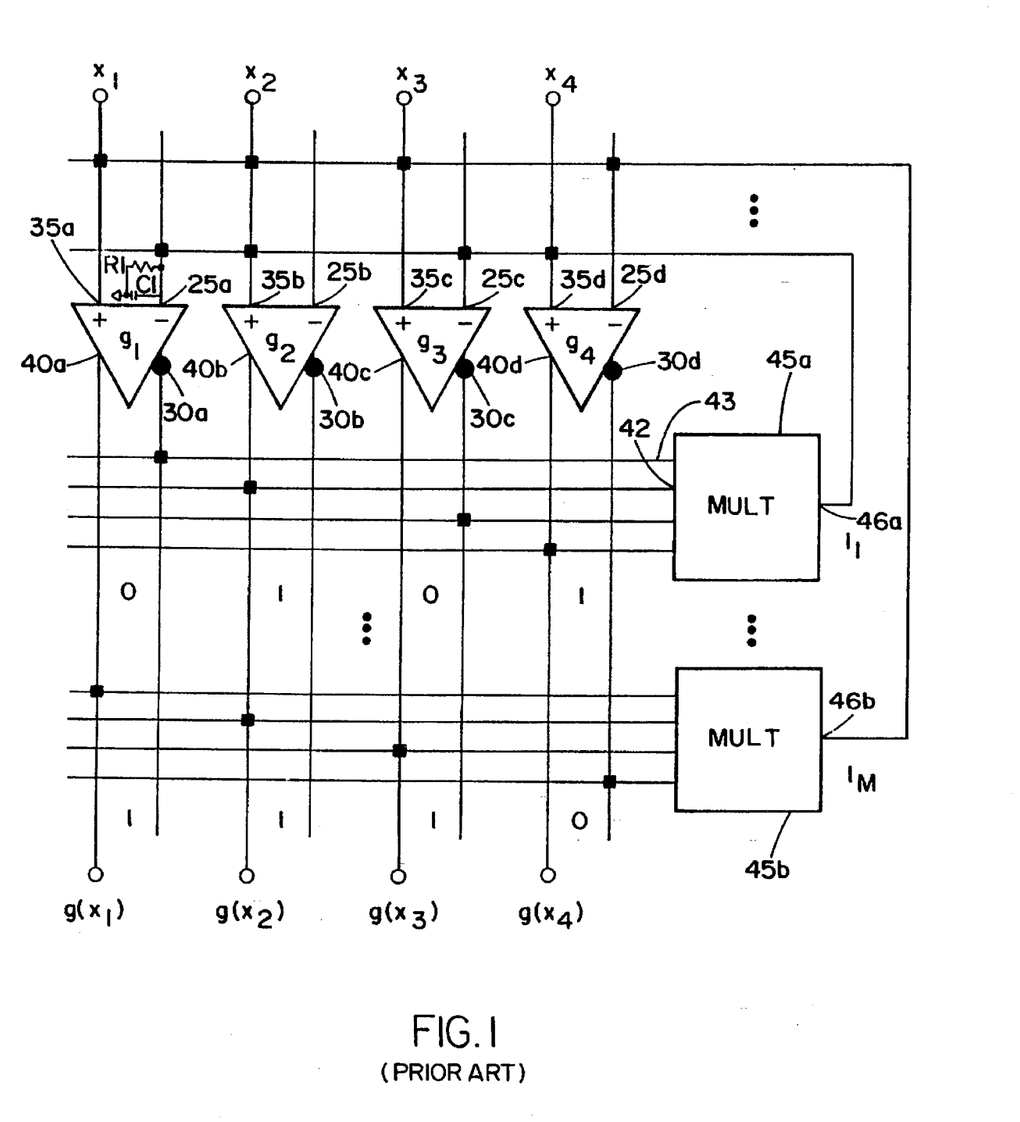
FIG. 1 is a generalized schematic diagram for the high order associative memory with connectivity for the exemplary storage of two bit patterns.

FIG. 1 shows a generalized architecture of an auto-associative high order neural network in the form of a schematic block diagram for a 4-neuron system with connectivity for the storage of two 4-bit memory patterns i.e., 4-bit binary codes (0,1,0,1) and (1,1,1,0). Two different types of units are employed. The units $g_i$, i=1, ..., 4 are common nonlinear amplifiers having finite gain and a continuous input-output relation, which can be either a linear threshold, as shown in FIG. 3, a sigmoidal function or any other bounded monotonic increasing function (not shown). Each of the amplifiers have an inverted input 25a,b,c,d (marked by the minus sign) and an inverted output marked by the black dots 30a,b,c,d, in addition to the standard (non-inverted) inputs 35a,b,c,d and non-inverting outputs 40a,b,c,d. The inverted inputs and outputs are used for internal feedback connections only. The inputs $x_i$ can take arbitrary analog values, whereas the continuous outputs $g(x_i)$, i=1, . . . , 4 are bounded between 0 and 1. The second type of units are multiplier devices 45a,b which performs a multiplication of all its n inputs and produces the result at its respective output 46a,b.

The exemplary circuit in FIG. 1 with n=4 amplifiers allows the storage of binary patterns of length n. The patterns or words to be stored in the associative memory are denoted by $\{ml\}$, l=1, . . . M, with the components (bits) $ml_i$=0 or 1, for i=1, . . . n. The storage of each word ml requires a feedback loop employing one multiplier device. A particular word $\{m\}$ is "stored" in the network by connecting the inputs of a multiplier to the outputs of the amplifiers in a way that forms an image product Il as described above in equations (2) and (3) (a). The storage of word $m_1$=(0,1,0,1), for example, requires the connectivity shown in FIG. 1 to compute the image product $I_1=(1-g_1)g_2(1-g_3)g_4$. Since the $g_i$ are bounded between 0 and 1, each Il satisfies $0 \leq Il \leq 1$. In order to store a bit ml=1, a connection is made between a non-inverting output of amplifier $g_i$ (for e.g., output 40b of amplifier $g_2$) and one input 42 of multiplier 45a, whereas, a bit $ml_i$=0 requires a connection from an inverting output of amplifier $g_i$ (for e.g., output 30a of amplifier $g_1$) and an input 43 of multiplier 45a. The output of a multiplier with the image product Il is fed back to the inputs by making a connection to the inverted input of amplifier $g_i$ (for e.g., input 25a of amplifier $g_1$), if $ml_i$=0, and, a connection to the non-inverted input of amplifier $g_i$, (for e.g., input 35b of amplifier $g_2$), if $ml_i$=1. All the connections, which are represented by black squares in FIG. 1, have the same weight values. Thus, the storage of information does not require a learning algorithm. Instead, the bit-patterns are explicitly hard-wired into the network by using a feedback loop including one multiplier for each word stored in memory.

Each amplifier of will contain a capacitor element and resistance, or equivalents thereof, for determining the time-constant for the physical realization of the network. Only one amplifier $g_1$ is shown in FIG. 1 as having such elements R1 and C1. Without loss of generality, those terms equal 1, which results in the equations of motion describing the time evolution of the system described in equation (1) above. The term $(2ml_i-1)$ describes the connection of a particular feedback loop to either the non-inverting or the inverting input of amplifier $g_i$ depending on the bit-value $ml_i$. By substituting Il from equation (2) in equation (1), the high order character of the dynamical system caused by the product terms for an $ml_i$=(0,1,0,1), becomes as follows:

$$dx_1/dt = -x_1 - (1-g_1)g_2(1-g_3)g_4$$
$$dx_2/dt = -x_2 + (1-g_1)g_2(1-g_3)g_4$$
$$dx_3/dt = -x_3 - (1-g_1)g_2(1-g_3)g_4$$
$$dx_4/dt = -x_4 + (1-g_1)g_2(1-g_3)g_4 \quad (4)$$

By inspection, the only constant trajectory for the system of FIG. 1 with $g_i$ values of 0 or 1 is $\underline{x}=(-1,1,-1,1)$.

As can be seen from the FIG. 1 and the accompanying description, it is understood that there is an image product Il formed for each of the M valid code words. For block codes (n,k) of n bits with k information bits (i.e., $2^k$ possible valid words) the system will require M×n analog multipliers to form the image products because n is the number of neurons and M equals $2^k$ the number of valid code words. For example the block (7,4) code, there would be 112 multiplies ($2^4 \times 7$) required, or, 112 two-multiplicand multipliers. For a (15,7) code, there are 1920 ($2^4 \times 15$) multiplies.

The Minimum Operator

In order to simplify the electronics in implementing the high-order neural network model, the multiplication operator is replaced with a minimum operator, which functions to automatically generate an approximation of the image product comprising the lowest or "minimum" voltage to be multiplied. Since the multiplicands (neuron outputs) are bounded, i.e., all either a zero (0) or a one (1), and if the state of the system is not in the above-mentioned transition zone $T_e$, then the minimum operator may replace any multiplication circuitry. Any zero (0) multiplicand in the image product will make the whole image product zero. Further, if all the other multiplicands are one (1), the product will equal the non 1 value (minimum value). Even in the case where all but one multiplicands are close to one, the effect on the system dynamics is essentially the same. The minimum analog value can be found in parallel using simple diodes connected in reverse bias from the outputs of the state neuron amplifiers to a pulled-up node. Alternatively, any reversed biased device, e.g., transistor, SCR, etc., may be used as the minimum operator.

Figure 2:
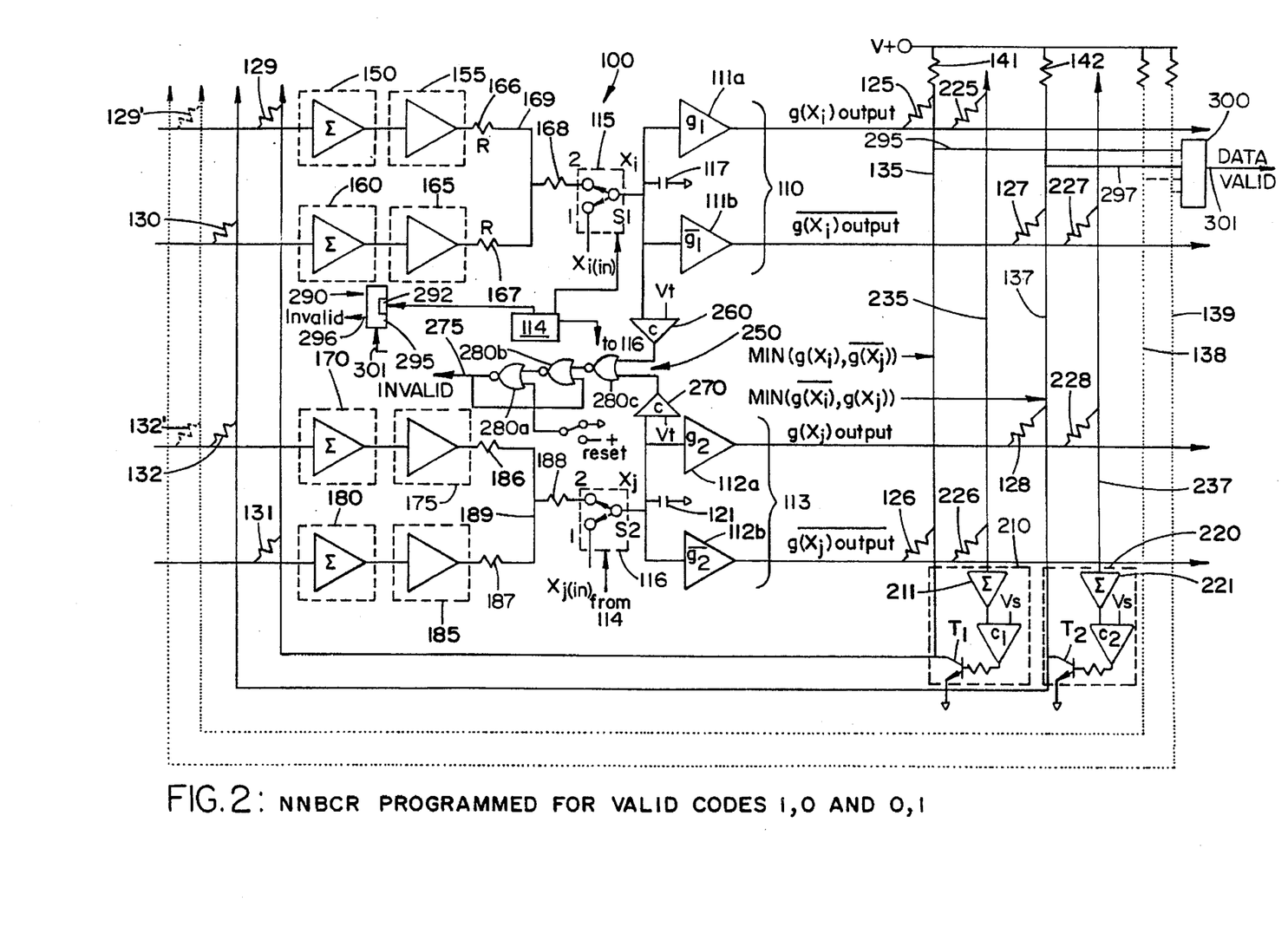
FIG. 2 is a schematic diagram of the neural network binary code recognizer 100 (NNBCR) of the instant invention.

FIG. 2 illustrates the preferred embodiment of the high-order neural network binary code recognizer 100 of the instant invention that is programmed to recognize two valid 2-bit code words $M_1$=1,0 and $M_2$0,1. It should be understood that the system 100 described hereinbelow is an extremely simple (2 dimensional) model and that the system is expandable for recognizing and decoding M binary code words each of n-bits (n-dimensional).

The two-dimensional NNCBR 100 programmed for recognizing valid code words of 2-bits each, comprises two neurons 110, 113, the first neuron 110 comprising non-inverting amplifier element 111a, indicated as $g_1$, and inverting amplifier comprising element 111b, indicated as $g_1$(not). The second neuron 113 comprises non-inverting amplifier element 112a, indicated as $g_2$, and inverting amplifier element 112b indicated as $g_2$(not). The outputs of the system are the voltages on capacitors 117 and 121, or, the outputs of $g_1, g_1$(not) and $g_2, g_2$(not).

Switches 115,116 are single pole, double throw switches that are provided for respective neurons 110, 113 for connecting the received analog inputs $x_{i(in)}$ and $x_{j(in)}$, representing the respective bits of a coded digital word, into the system 100. Each switch 115,116 is initially in a respective first position 1 (indicated by broken lines) for inputting the analog voltages of bit values $x_{i(in)}$ and $x_{j(in)}$, respectively, into the system, and are timed by timing circuit 114 to switch to respective second positions 2 (indicated by the solid lines) to connect the respective inputs, indicated as $x_i$, $x_j$ to their feedback paths and allow the system 100 to stabilize as the outputs of the neuron amplifiers dynamically approach a stored valid memory word. Capacitor 117 of neuron 110 is provided to determine the time constant for the neuron 110 and the voltage thereof represents the state of the neuron. Likewise, capacitor 121 of neuron 113 determines the time constant for the neuron 113 of the system, and the voltage thereof represents the state of the neuron. Preferably, the switching time between the first positions and the second positions of each switch, 115, 116, as controlled by timing circuit 114, is chosen to enable respective capacitors 117 and 121 to sufficiently charge to their respective input voltage values. All timing circuit values are chosen so that the system time constant is compatible with slew rates of the rest of the circuit.

As mentioned previously, the system 100, as shown in FIG. 2, is configured to recognize two 2-bit valid code words. The mechanism for storing valid memory words (stable attractors) in the system is the same as generally described above with reference to FIG. 2. Namely, the two 2-bit memory words $M_1$, $M_2$ stored in the system are shown as reverse-biased diodes connecting the state neuron outputs with the inputs of the neurons. For instance, bit 1 (value=1) of valid word $M_1$=(1,0) is stored by coupling reverse-biased diode 125 from the non-inverting output $g_1(x_i)$ of neuron 110, through feedback line 135 to resistor 129 coupled to summing amplifier 150 and amplifier 155, which, for reasons explained below, form the non-inverting input of the neuron 110. Bit 2 (value=0) of valid word $M_2$=(1,0) is stored by coupling reverse-biased diode 126 from the inverting output $g_2(x_j)$ of neuron 113, through feedback line 135 to resistor 131 coupled to summing amplifier 180 and inverting amplifier 185, which, for reasons explained below, form the inverting input of the neuron 113.

Similarly, for storing bit 1 (value=0) of stored valid word $M_2$ (=0,1), a reverse-biased diode 127 couples the inverting output $g_1(x_i)$ of neuron 110, through feedback line 137 to resistor 130 coupled to summing amplifier 160 and inverting amplifier 165, which, for reasons explained below, form the inverting input of the neuron 110. Likewise, bit 2 (value=1) of valid word $M_2$=(0,1) is stored by coupling reverse-biased diode 128 from the non-inverting output $g_2(x_j)$ of neuron 113, through feedback line 137 to resistor 132 coupled to summing amplifier 170 and non-inverting amplifier 175, which, for reasons explained below, form the non-inverting input of the neuron 113. It should be understood that response characteristics of diodes 125–128 should be as closely matched as possible and that the values of resistors 129–131 are preferably of equal value.

As previously described with reference to Equations (1) and (2) above, an image product $I_m$, where m=1 or 2 is formed for each of the valid code words $M_1$, $M_2$, respectively. As described above, each image product is essentially a multiplication operator designed to function in accordance with equation (2) above. However, as described briefly above, each multiplier may be replaced with a minimum operator due to the fact that all neuron outputs are either a 0 or 1 during most of the operation of the device. Thus, the minimum operator for forming image product $I_1$ is implemented in system 100 as diodes 125,126 which couple the $g_1(x_i)$, $g_2(x_j)$ (not) outputs of neurons 110,113, respectively, to the feedback line 135. Thus, the minimum voltage determined by the diodes 125,126 on feedback line 135 represents the image product $I_1$ corresponding to the valid code word $M_1$. Likewise, the minimum operator for forming image product $I_2$ is implemented in system 100 as diodes 127,128 which couple the $g_1(x_i)$ (not), $g_2(x_j)$ outputs of neurons 110,113, respectively, to the feedback line 137. Thus, the voltage on feedback line 137 represents the image product $I_2$ corresponding to the valid code word $M_2$. As shown in FIG. 2, each image product $I_1$,$I_2$ is connected with a voltage source $V^+$ by appropriate pull-up resistors 141,142 respectively. It is understood that diodes 125–128 functioning as the minimum operator, may be implemented as any reverse biased device, for e.g., transistor, SCR, and the like.

To accurately implement the dynamic memory model of the high order neural network governed by equation (1), it is required to feed the Image Products, e.g., $I_1$,$I_2$, back to the inputs of each state neuron in accordance with the bit value (0 or 1) of the code word $M_1$, $M_2$. In accordance with equation (1), the feedback term containing the image products from all the stored memories is the summation term:

$$\sum_{l=1}^{M} (2ml_i - 1)Il \quad (5)$$

where "i" is the number of the bit of the valid stored memory word. To implement this term in the system 100 shown in FIG. 2, the image product $I_1$,$I_2$ formed for valid memory codes $M_1$,$M_2$ are fed back to the neuron inputs of the appropriate polarity. For instance, image product $I_1$ is fed back to the $x_i$ input through resistor 129, summing amplifier 150, and amplifier 155, and, is fed back to the $x_j$ input through resistor 131, summing amplifier 180 and amplifier 185. Likewise, the Image product $I_2$ formed for valid memory code $M_2$ is fed back to the $x_i$ input through resistor 130, summing amplifier 160, and amplifier 165, and, is also fed back to the $x_j$ input through resistor 132, summing amplifier 170, and amplifier 175. For neuron 110 corresponding to state $x_i$, amplifier 155 is a non-inverting amplifier and, with the appropriate gain, constitutes the non-inverting input of the neuron, and amplifier 165 is an inverting amplifier and constitutes the inverting input of the neuron. Likewise, for neuron 113 corresponding to state $x_j$, amplifier 175 is a non-inverting amplifier and constitutes the non-inverting input of the neuron and amplifier 185 is an inverting amplifier and constitutes the inverting input of the neuron. The stored bit of binary value 1 of image product $I_1$ is thus fedback to the non-inverting input of neuron 110 while the stored bit of binary value 0 of image product $I_1$ is fedback to the inverting input of neuron 113. The stored bit of binary value 0 of image product $I_2$ is fedback to the inverting input of neuron 110 and the stored bit of binary value 1 of image product $I_2$ is fedback to the non-inverting input of neuron 113.

It should be mentioned that in the preferred embodiment, each amplifier 155, 165, 175, and 185 has a gain of two for accommodating the two times division in each voltage divider network 169 formed by resistors 166, 167 and, voltage divider network 189 formed by resistors 186,187. Voltage divider networks 169 and 189 are provided for adding the results of the positive and negative feedback to each respective neuron 110 and 113.

Since the binary code recognizer 100 is designed for the simple 2-dimensional case of recognizing only two, 2-bit code words, there is no other image product to be fed back to the summing amplifier 150. In an embodiment where it is desired to recognize additional two bit binary code words, for e.g., $M_3$=(1,1) and $M_4$=(0,0), it is necessary to form respective image products $I_3$, $I_4$ for each of these words and feed the image products back, for instance, on unused feedback lines 138 and 139 as indicated in FIG. 2, to their corresponding neuron inputs. Therefore, to store a valid code word $M_3$=(1,1), the image product $I_3$ will be fed back on line 138 to summing amplifier 150 via resistor 129' and summing amplifier 170 via resistor 132', whereby both resistors are indicated as broken in FIG. 2.

For systems that recognize valid codes of higher dimensions, it is necessary to detect the case where many of the multiplicands involved in an image product are near zero. When this happens, the image product should be much smaller than the minimum multiplicand and a zero should be substituted for the minimum function. Thus, in such an embodiment an additional comparator circuit is added to the system which compares the sum of each of the multiplicands (neuron outputs) with a threshold voltage $V_s$. If the sum of the multiplicands, i.e., neuron outputs for each valid stored memory, is less than a threshold $V_s$, the image product is forced to a zero. If the sum is greater than a threshold $V_s$, the minimum multiplicand is used to approximate the image product. This is shown mathematically by equations (6)

$$\text{if, } \sum_{j=1 \text{ to } n} (ml_j g(X_j) + (1 - ml_j)(1 - g(x_j))) \geq V_s, \text{ then} \quad (6)$$

$$I1 = \text{MIN} \quad (ml_j g(x_j) + (1 - ml_j)(1 - g\{x_j\}));$$
$$j=1 \text{ to } n$$

$$\text{if } \sum_{j=1 \text{ to } n} (ml_j g(x_j) + (1 - ml_j)(1 - g(x_j))) < V_s, \text{ then}$$

$$I1 = 0;$$

Thus, in system 100 of FIG. 2, the neuron output voltage $g(x_i)$ through summing resistor 225 and neuron output voltage $g(x_j)$ (not) through summing resistor 226 are connected to feedback line 235 and the voltages are summed and compared by circuitry 210 comprising summation amplifier 211, and comparator $C_1$. Specifically, the resultant summed voltage at the neuron outputs 110, 113 for each stored word is compared with a threshold voltage $V_s$, typically of 60% to 80% of maximum volts $V^+$, by comparator circuits $C_1$ and $C_2$. If the summation is less than the threshold voltage $V_s$, the output of comparator $C_1$ remains high and image product $I_1$ on feedback line 135 is forced to zero volts by turning on transistor $T_1$. If the summation is greater than the threshold voltage $V_s$, the output of comparator $C_1$ goes low, turning $T_1$ off, and the image product $I_1$ on feedback line 135 becomes the minimum approximate of the image product $I_1$ as discussed above. Circuitry 220 is provided so that the neuron output voltage $g(x_i)$ (not) through summing resistor 227 and neuron output voltage $g(x_j)$ through summing resistor 228 are connected to feedback line 237 and the voltages are summed and compared by summation amplifier 221, and comparator $C_2$, respectively. Again, if the summation is less than the threshold voltage $V_s$, the output of comparator $C_2$ remains high and image product $I_2$ on feedback line 137 is forced to zero volts by turning on transistor $T_2$. If the summation is greater than the threshold voltage $V_s$, the output of comparator $C_2$ goes low, turning $T_2$ off, and the image product $I_2$ on feedback line 137 becomes the minimum approximate of the image product $I_2$ as discussed above. It should be understood that the value of threshold voltage $V_s$ is chosen by design and is largely determined by the number of stored code word bits, the noise level in the circuit, the spacing difference between the stored memories, etc.

Figure 4:
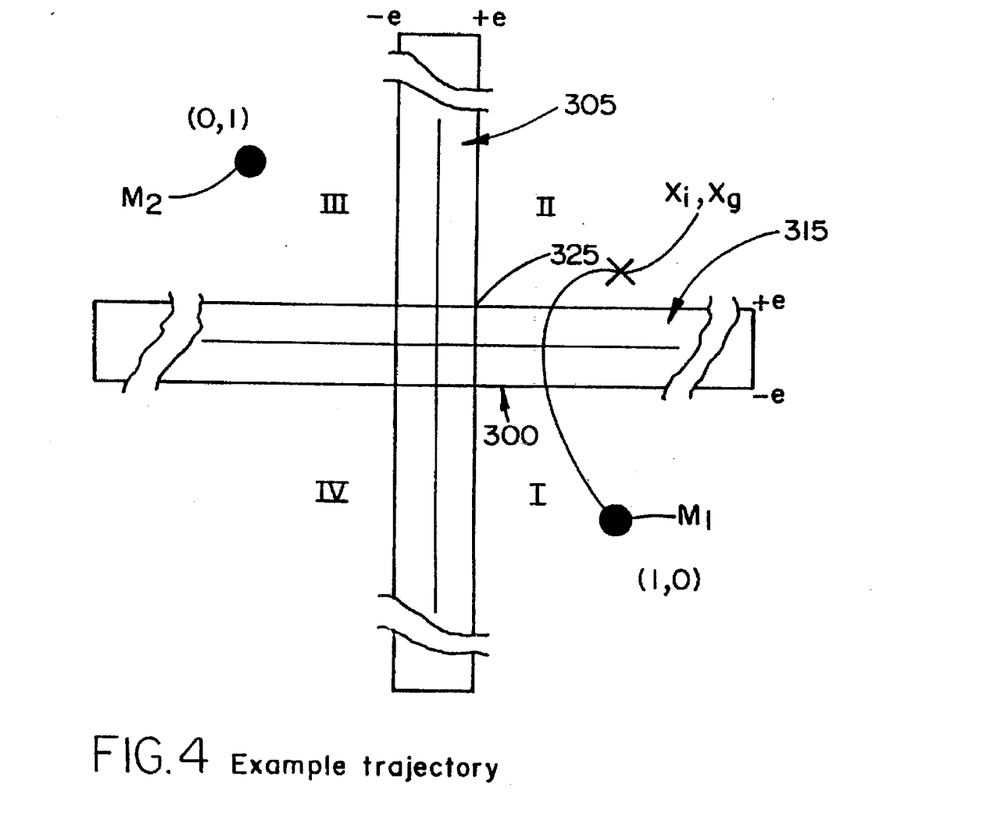
FIG. 4 illustrates an example trajectory of the NNCBR system converging to a memory given an initial input.

As mentioned above, FIG. 3 illustrates the linear ramp gain function for neuron (amplifier), $g(x_i)$, and the neuron amplifier transition region bounded by values $-e$, $+e$. Functionally, as described above with respect to equation 3, the transition region is a region where the amplifier input $x_i$ or $x_j$ is of a value in a range $-e \leq x \leq e$, and the output $g(x)$ has not reached its steady state bounded output (binary 0 or 1). FIG. 4 is a two-dimensional state space diagram for the two neuron neural network 100 of the present invention showing the transition region 300 having a column component 305 where the neuron (e.g., 110) that determines the horizontal position of the system trajectory (e.g., $x_i$) is in transition, and a row component 315 where the neuron (e.g., 113) that determines the vertical position of the system trajectory (e.g., $x_j$) is in transition. The dark shaded region 325 at the origin, is the region where both $x_i$ and $x_j$ are both in transition.

As illustrated in FIG. 4, the stored valid memory words $M_1$ (=1,0) and $M_2$ (=0,1) reside in a two-dimensional space with word $M_1$ residing in orthant labelled I and word $M_2$ residing in orthant labelled III. When the analog inputs $x_i$ and $x_j$ representing a digitally encoded word are input to the system 100 and have values which place it in the same orthant where a valid (prestored) memory word $M_1,M_2$ resides, the system trajectory is such that the neuron outputs will dynamically approach the nearest stored word (stable attractor) residing in that orthant.

It may be the case that the received analog inputs, $x_i$ and $x_j$, are of values which place it in an orthant not having a valid prestored memory word. For instance, as shown in FIG. 4, the initial input labelled "X" $(x_i,x_j)$ are of voltages having values which place it in orthant labelled II. In such a case, all image products, $I_1$ and $I_2$, are zero due to the minimum operator, and the system state ($x_i$ and $x_j$) decays toward the origin (both state capacitors 117,121 in FIG. 2 are discharged and decay to ground). As the state voltages decay, however, they will reach a transition region and cross into the row component 315 of the transition region 300. This component dictates the vertical trajectory of the system and causes the image product $I_1$ corresponding to code (1,0) to grow from zero to one. This growing image product results in a positive feedback effect which drives the neuron amplifier $g_2$(not) more negative causing the system to accelerate downward and to the right toward orthant I resulting in a curve in the trajectory toward memory $M_1$ (=1,0). Generally, whichever component of the transition region is crossed first will dictate the trajectory of the system.

In the case of symmetry, where the input $x_i$, $x_j$ equidistant from more than one valid code (memory), there is no correct answer and the system trajectory will pass through the origin (or get stuck at the origin). To detect such an occurrence, as shown in FIG. 2, the system 100 is provided with monitoring circuitry 250 that includes comparator circuits 260 and 270 connected with inputs $x_i$ and $x_j$, respectively, that will output a logic 0 when $x_i$ or $x_j$ are of voltages within some threshold voltage $\pm V_t$ of the origin. In the preferred embodiment, the voltage threshold $V_t$ that the inputs $x_i$ and $x_j$ are compared, $\pm e$ volts. Additionally, a signal 275 indicating that an answer can not be found (due to symmetry) is produced by latching circuitry 276, which is provided to detect when the comparators 260, 270 have simultaneously output a logic 0. Latching circuitry may include NOR gates 280a,b,c that are connected to the outputs of the comparators 260, 270 in a latching configuration. The comparators can be adjusted to detect an arbitrarily close-to-the origin trajectory so that NNBCR results can also have a controllable confidence interval.

It should be understood that the closer the analog code inputs are to a stored valid memory word, the shorter the time for system convergence. Thus, an alternate means for determining whether or not a valid code word is recognized is to compare the time it takes for the image products to converge, i.e., reach a stable attractor, with a predetermined time threshold. As shown in FIG. 2, when the time circuit 114 switches the received signals $x_{i(in)}$ and $x_{j(in)}$ into the system 100, it simultaneously triggers counter/timer circuitry 290, which may comprise a clock circuit 292 and counter circuit 293, for counting (up or down) the time it takes for the system 100 to converge. If the system does not converge in a predetermined time as programmed within the timer circuit 290, a data invalid signal 296 will be generated, indicating that the system did not converge possibly due to symmetry. The programmed time limit will vary in accordance with the (code word) bit amount.

As shown in FIG. 2, the image product that is generated on feedback lines 135 and 137 after the timer 114 switches the received signals $x_{i(in)}$ and $x_{j(in)}$ into the system 100, is connected via lines 295 and 297, respectively, to additional logic circuitry 299. This logic circuit 299 will generate a data valid signal 301 when a valid code word has been detected (system converged). Logic circuitry 299 is able to detect that data is valid at the time when exactly one image product is maximally activated, i.e., when the state of the system is in the correct orthant and outside of the transition region. This data valid word may be input to the timer/counter circuit 290 as shown in FIG. 2, to stop or reset the counter/timer 290 (that has been simultaneously triggered by switch 114) if the system converges before the programmed timer times out. If the generated image product output on lines 135 and 137, converges, then the timer 290 will stop and the data invalid output signal 296 will not toggle. If the generated image product output on lines 135 and 137 do not converge, then the counter/timer circuitry will time out first and the data invalid signal 296 will toggle, indicating no valid data has been received.

Figures 5A, 5B:
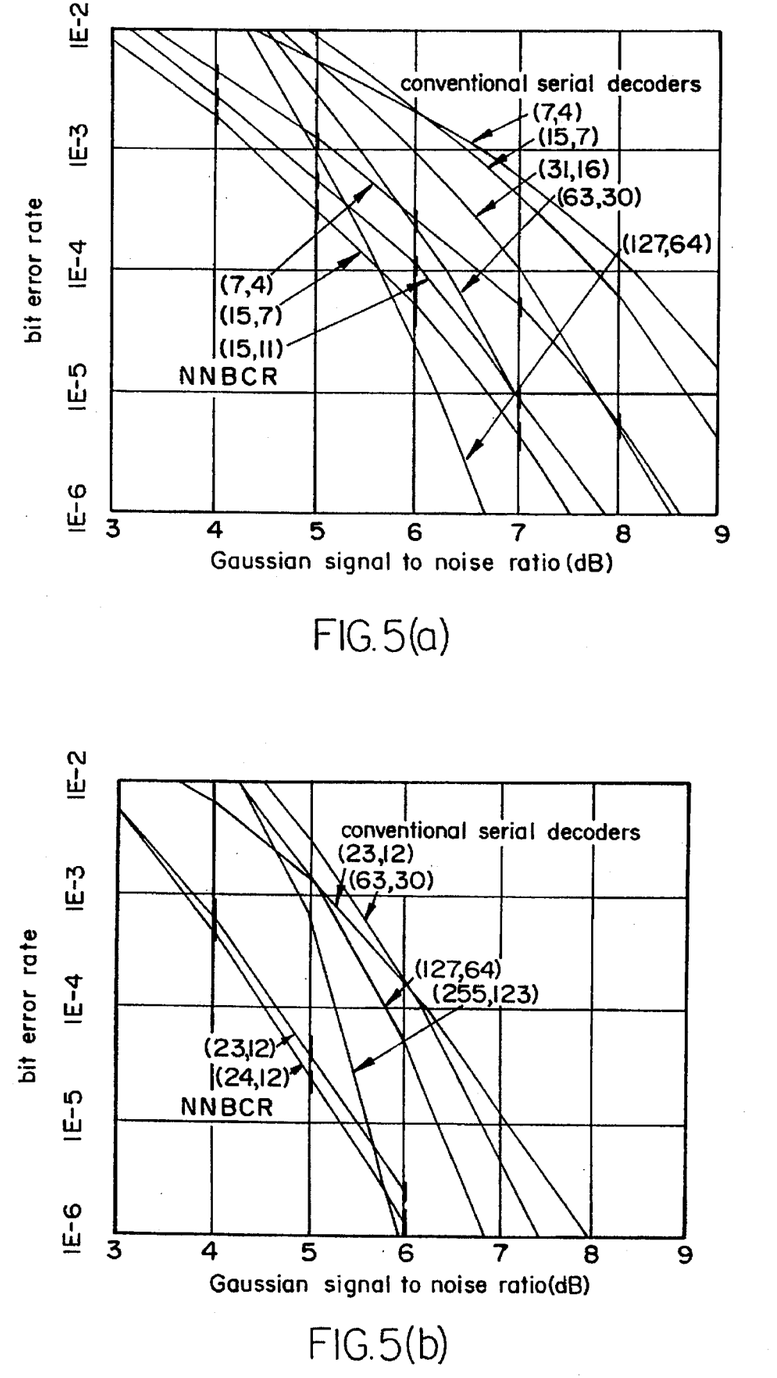
FIGS. 5(a) and 5(b) illustrate the results of comparisons using the digital decoding technique of the NNBCR of the instant invention as compared with conventional serial decoders.

The preferred embodiments of the neural network binary code recognizer 100 of the instant invention will lower the error rate for typical error correction code systems according to the curves in FIGS. 5(a) and 5(b). This can mean one to three orders of magnitude less error for typical applications or a significant reduction in the number of transmitted bits required for a given error rate.

As shown in FIG. 5(a), for example, given a Gaussian SNR of 5.6 dB and a (15,7) code, the NNBCR has a bit error rate of 1 error in 10,000 transmissions compared with the conventional serial decoder's error rate of 1 error in about 400 transmissions. As another example illustrated in FIG. 5(b), given a Gaussian SNR of 5 dB and a (23,12) code, the NNBCR has a bit error rate of 1 error in 50,000 transmissions compared with the conventional serial decoder's error rate of 1 error in about 900 transmissions.

Although shown and described in what we believed to be the most practical and preferred embodiments, it is apparent that departures from the specific methods and designs described and shown will suggest themselves to those skilled in the art and may be made without departing from the spirit and scope of the invention. For instance, the neural network binary code recognizer of FIG. 2 may be n-dimensional and designed to recognize M code words of n-bits each. We, therefore, do not wish to restrict ourselves to the particular constructions described and illustrated, but desire to avail ourselves of all modifications that may fall within the scope of the appended claims.

What is claimed is:

1. A neural network binary code recognizer for decoding a corrupted n-bit binary code word, said binary code recognizer comprising:
    means for inputting n input signals into said recognizer, each input signal representing a bit value of said corrupted n-bit binary code word;
    n amplifier means each having an input for receiving a respective input signal, each said amplifier means conditioning each said respective input signal to form a respective output signal at one or more outputs of each said amplifier means;
    storing means connected at said one or more outputs of each said n amplifier means for storing one or more bit values of one or more corresponding predetermined valid n-bit binary code words;
    means for generating an approximate image product for each said one or more predetermined valid n-bit binary code words, each said approximated image product comprising a product of each said output signal from each said amplifier means in accordance with a respective one of said predetermined valid n-bit binary code words; and
    feedback means connecting each said approximated image product with one said input of each said amplifier means in accordance with a respective one of said one or more bit values of one or more of said predetermined valid n-bit binary code words, said feedback means enabling said output signal of a respective one of said amplifier means to dynamically approach each bit value of an n-bit binary code word.

2. The neural network binary code recognizer according to claim 1 wherein said means for inputting is a switch connecting each of said n signals with a respective one of said n amplifier means when said switch is in a first position and connecting each said feedback means with a respective one of said n amplifier means when said switch is in a second position to thereby enable each said output of said respective amplifier means to approach a binary bit value of said n-bit binary code word.

3. The neural network binary code recognizer according to claim 2 wherein said switch is timed to switch from said first position to said second position at a predetermined amount of time.

4. The neural network binary code recognizer according to claim 1 wherein said means for generating an approximated image product includes a reverse biased diode connecting each said amplifier output signal from each said n amplifier means to said feedback means.

5. The neural network binary code recognizer according to claim 4 wherein each said reverse biased diode enables an approximated image product to have a value equivalent to a minimum output voltage value of each amplifier output signal from each said n amplifier means connected thereto.

6. The neural network binary code recognizer according to claim 1 wherein each said n input signals is an arbitrary analog voltage, one or more of said n input signals representing a corrupted bit of said n-bit binary code word.

7. The neural network binary code recognizer according to claim 1 wherein each said amplifier means has a predetermined gain characteristic representing a bounded monotonic function.

8. The neural network binary code recognizer according to claim 7 wherein said predetermined gain characteristic is a bounded ramp function.

9. The neural network binary code recognizer according to claim 7 wherein said predetermined gain characteristic is a bounded sigmoid function.

10. The neural network binary code recognizer according to claim 1 wherein said each said one or more amplifier outputs include first and second outputs of opposite slope.

11. The neural network binary code recognizer according to claim 1 wherein each output of said n amplifiers is a bounded output having values ranging from binary 0 or 1.

12. The neural network binary code recognizer according to claim 11 wherein each amplifier means includes one or more amplifier inputs for receiving said approximated image products, said one or more amplifier inputs including first and second inputs of opposite polarity.

13. The neural network binary code recognizer according to claim 12 wherein said feedback means connects said approximated image product corresponding to each predetermined valid n-bit word to a first input of said amplifier means having a positive polarity when the bit values stored by a respective storing means are of a binary value of 1, said feedback means further connecting said approximated image product to said second input of said amplifier means having a negative polarity when the bit values stored by a respective storing means are of a binary value of 0.

14. The neural network binary code recognizer according to claim 1 wherein said means for generating an approximated image product includes:

a) means for summing each said output signal at one of said n amplifier outputs for said valid n-bit binary code word to generate a summed voltage thereof;

b) means for comparing said summed voltage with a predetermined threshold voltage; and c) means for forcing said approximated image product for said valid n-bit binary code word to a predetermined value when said summed voltage is less than said predetermined threshold voltage.

15. The neural network binary code recognizer according to claim 14 wherein said predetermined value for said approximated image product is about zero volts.

16. The neural network binary code recognizer according to claim 1 wherein each word of said one or more predetermined valid n-bit binary coded words constitutes a stable attractor for said recognizer.

17. The neural network binary code recognizer according to claim 1 further including monitoring means for comparing each said n input signals with a predetermined threshold value, said monitoring means including means for generating an output signal indicating that an error may occur when each of said n signals are within a predetermined range of zero volts.

18. The neural network binary code recognizer according to claim 17 wherein said means for generating said error indicating output signal is a latching circuit.

* * * * *